(12) United States Patent
Liu et al.

(10) Patent No.: US 11,726,212 B2
(45) Date of Patent: Aug. 15, 2023

(54) DETECTOR FOR POINT CLOUD FUSION

(71) Applicants: Baidu USA LLC, Sunnyvale, CA (US); Baidu.com Times Technology (Beijing) Co., Ltd., Beijing (CN)

(72) Inventors: Xiang Liu, Beijing (CN); Shuang Zhang, Beijing (CN); Bin Gao, Beijing (CN); Dongchao Gao, Beijing (CN); Fan Zhu, Beijing (CN)

(73) Assignees: BAIDU USA LLC, Sunnyvale, CA (US); BAIDU.COM TIMES TECHNOLOGY (BEIJING) CO., LTD, Beijing (CN)

( * ) Notice: Subject to any disclaimer, the term of this patent is extended or adjusted under 35 U.S.C. 154(b) by 543 days.

(21) Appl. No.: 16/771,299

(22) PCT Filed: May 15, 2020

(86) PCT No.: PCT/CN2020/090420
§ 371 (c)(1),
(2) Date: Jun. 10, 2020

(87) PCT Pub. No.: WO2021/226981
PCT Pub. Date: Nov. 18, 2021

(65) Prior Publication Data
US 2021/0356562 A1     Nov. 18, 2021

(51) Int. Cl.
| | | |
|---|---|---|
| *G01S 17/931* | (2020.01) | |
| *G01S 7/48* | (2006.01) | |
| *G01S 17/42* | (2006.01) | |
| *G06V 20/56* | (2022.01) | |
| *G01S 7/295* | (2006.01) | |

(52) U.S. Cl.
CPC .......... *G01S 17/931* (2020.01); *G01S 7/4808* (2013.01); *G01S 17/42* (2013.01); *G01S 7/295* (2013.01); *G06V 20/56* (2022.01)

(58) Field of Classification Search
CPC ...... G01S 7/4808; G01S 17/931; G01S 17/42; G06V 20/56
See application file for complete search history.

(56) References Cited

U.S. PATENT DOCUMENTS

| | | | | |
|---|---|---|---|---|
| 10,915,779 | B2 * | 2/2021 | Smirnov | G06F 18/231 |
| 11,527,076 | B2 * | 12/2022 | Liu | B60W 60/001 |
| 2020/0249353 | A1 * | 8/2020 | Di Cicco | G01S 17/931 |

* cited by examiner

Primary Examiner — Bryan Bui
(74) Attorney, Agent, or Firm — Womble Bond Dickinson (US) LLP

(57) ABSTRACT

A method, apparatus, and system for determining whether all extrinsic matrices are accurate is disclosed. A plurality of post-LIDAR fusion point clouds that are based on simultaneous outputs from a plurality of LIDAR devices installed at one ADV are obtained. The obtained plurality of point clouds are filtered to obtain a first set of points comprising all points in the plurality of point clouds that fall within a region of interest. Each point in the first set of points corresponds to one coordinate value on the axis in the up-down direction. A distribution of the first plurality of coordinate values is obtained. A quantity of peaks in the distribution of the first plurality of coordinate values is determined. Whether all extrinsic matrices associated with the plurality of LIDAR devices are accurate is determined based on the quantity of peaks in the distribution of the first plurality of coordinate values.

20 Claims, 7 Drawing Sheets

DETECTOR FOR POINT CLOUD FUSION

CROSS-REFERENCE TO RELATED APPLICATION

This patent application is a U.S. National Phase Application under 35 U.S.C. § 371 of International Application No. PCT/CN2020/090420, filed May 15, 2020, entitled "A DETECTOR FOR POINT CLOUD FUSION," which is incorporated by reference herein by its entirety.

TECHNICAL FIELD

Embodiments of the present disclosure relate generally to operating autonomous driving vehicles. More particularly, embodiments of the disclosure relate to calibration of sensors in an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR (Light Detection and Ranging, or a portmanteau of light and radar) techniques have been widely utilized in military, geography, oceanography, and in the latest decade, autonomous driving vehicles. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers, can be rapidly and repeatedly scanned across a scene to provide continuous real-time information on distances to reflective objects in the scene. Each full rotation of one laser beam produces one ring of points.

Some autonomous driving vehicles may be equipped with more than one LIDAR devices in order to reduce or eliminate blind areas. The output point clouds of the multiple LIDAR devices need to be transformed into a uniform frame of reference before they can be used for further processing, such as for the perception and planning processes. The uniform frame of reference used may commonly be the frame of reference of the Inertial Measurement Unit (IMU) of the autonomous driving vehicle. Such transformations may be referred to as LIDAR fusion, and are based on the extrinsic calibration parameters that can take the form of an extrinsic transformation/calibration matrix (or simply, an "extrinsic matrix"). Each LIDAR device may correspond to one extrinsic matrix that can be utilized in the transformation of the point cloud output of the LIDAR device into the common frame of reference. The calculation of an extrinsic matrix, and the transformation of the frame of reference of a point cloud based on an extrinsic matrix are well known in the art.

Inaccuracies in the extrinsic matrices used in the LIDAR fusion process may lead to errors in the fusion of the point clouds, and therefore errors in the subsequent perception and planning processes including, for example, the object detection process. An extrinsic matrix may be inaccurate as a result of faulty calibration or calculation, or may have become inaccurate due to the pose movement of the LIDAR device since the extrinsic matrix was last calculated.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
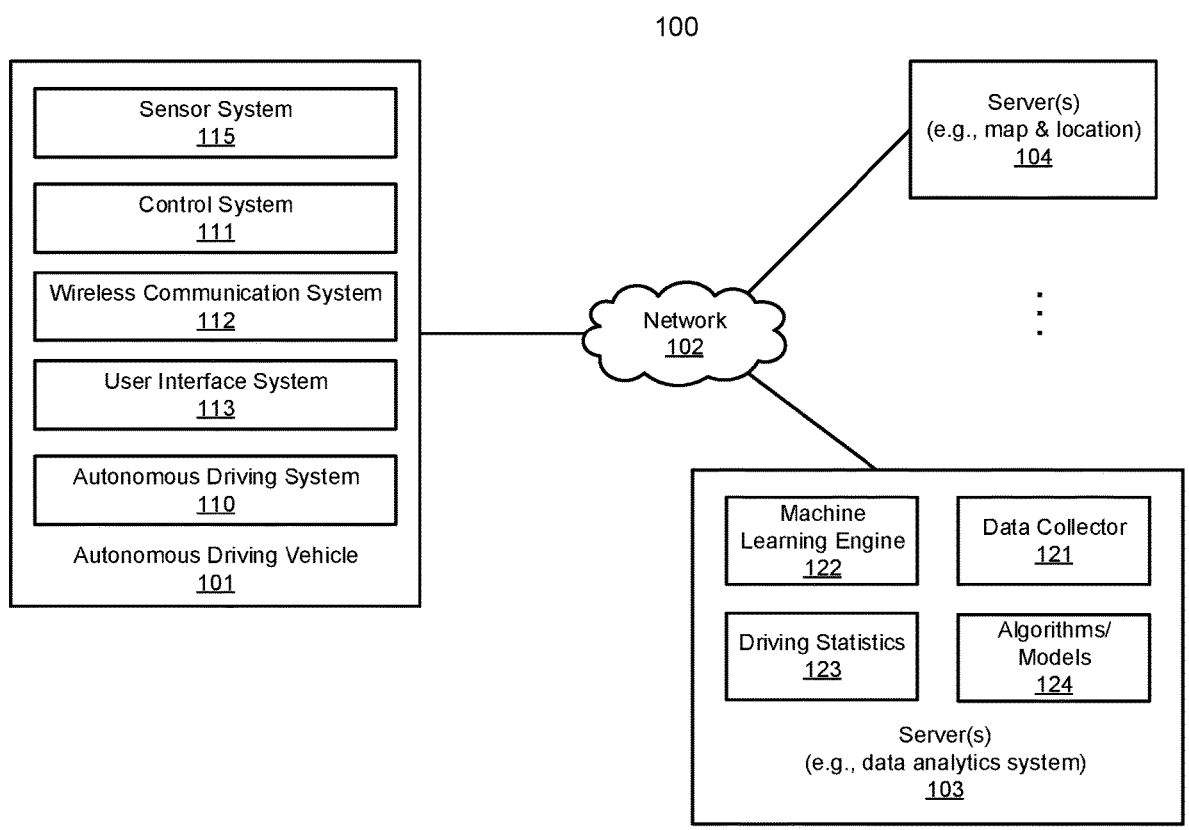
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A method, apparatus, and system for determining whether all extrinsic matrices associated with a plurality of LIDAR devices are accurate is disclosed. According to some embodiments, a plurality of post-LIDAR fusion point clouds that are based on simultaneous outputs from a plurality of LIDAR devices installed at one autonomous driving vehicle (ADV) are obtained. A respective first quantity of continuous frames of point clouds are obtained based on outputs from each of the plurality of LIDAR devices. The obtained plurality of point clouds is filtered to obtain a first set of points comprising all points in the plurality of point clouds that fall within a region of interest. The region of interest is an enclosed region in a bird's-eye view. A first plurality of coordinate values on an axis in an up-down direction of the first set of points are obtained. Each point in the first set of points corresponds to one coordinate value on the axis in the up-down direction. A distribution of the first plurality of coordinate values is obtained. A quantity of peaks in the distribution of the first plurality of coordinate values is determined. Whether all extrinsic matrices associated with the plurality of LIDAR devices are accurate is determined based on the quantity of peaks in the distribution of the first plurality of coordinate values. Thereafter, in response to determining that all extrinsic matrices associated with the plurality of LIDAR devices are not accurate, a user is prompted to recalibrate the extrinsic matrices.

In one embodiment, determining whether all extrinsic matrices associated with the plurality of LIDAR devices are accurate based on the quantity of peaks in the distribution of the first plurality of coordinate values comprises determining that all extrinsic matrices are accurate when there is a single peak in the distribution of the first plurality of coordinate values, and determining that all extrinsic matrices are not accurate when there are more than one peaks in the distribution of the first plurality of coordinate values.

In one embodiment, the plurality of post-LIDAR fusion point clouds is obtained when a quantity of detectable above-ground objects within a predefined range from the ADV is below a threshold. In one embodiment, no detectable above-ground object exists within the region of interest.

In one embodiment, the respective first quantity of continuous frames of point clouds comprise between 100 to 100,000 frames of point clouds.

In one embodiment, obtaining the distribution of the first plurality of coordinate values comprises generating a histogram of the first plurality of coordinate values. In one embodiment, a bin size of the histogram is between 0.05 meter (m) and 0.5 m.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
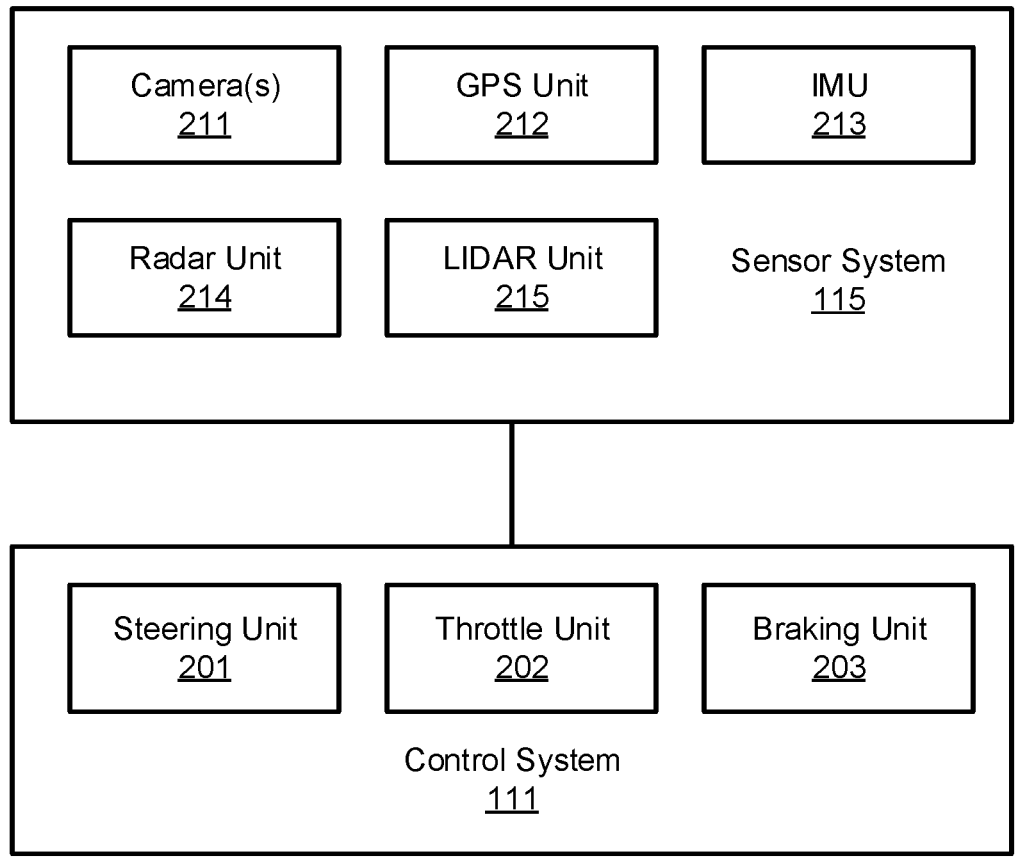
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
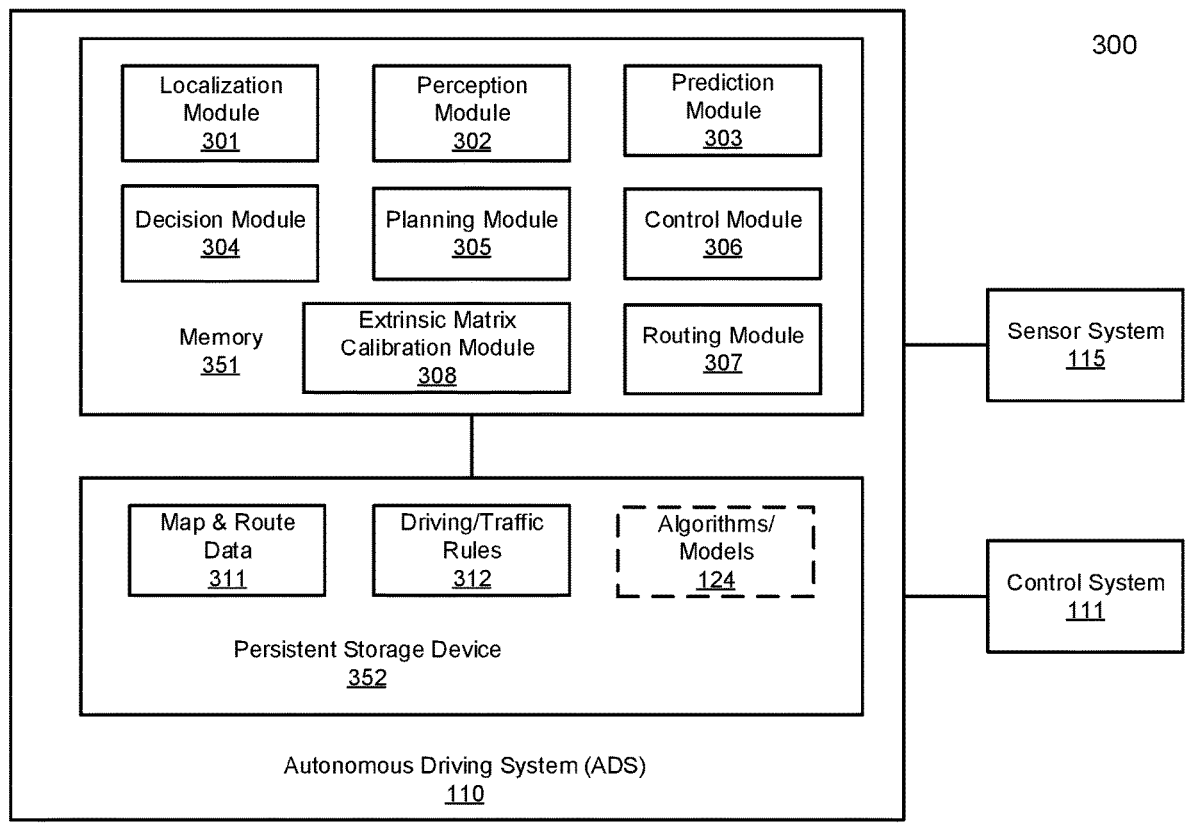
FIGS. 3A-3B are block diagrams illustrating an example of an autonomous driving system used with an autonomous driving vehicle according to one embodiment.
Figure 3B:
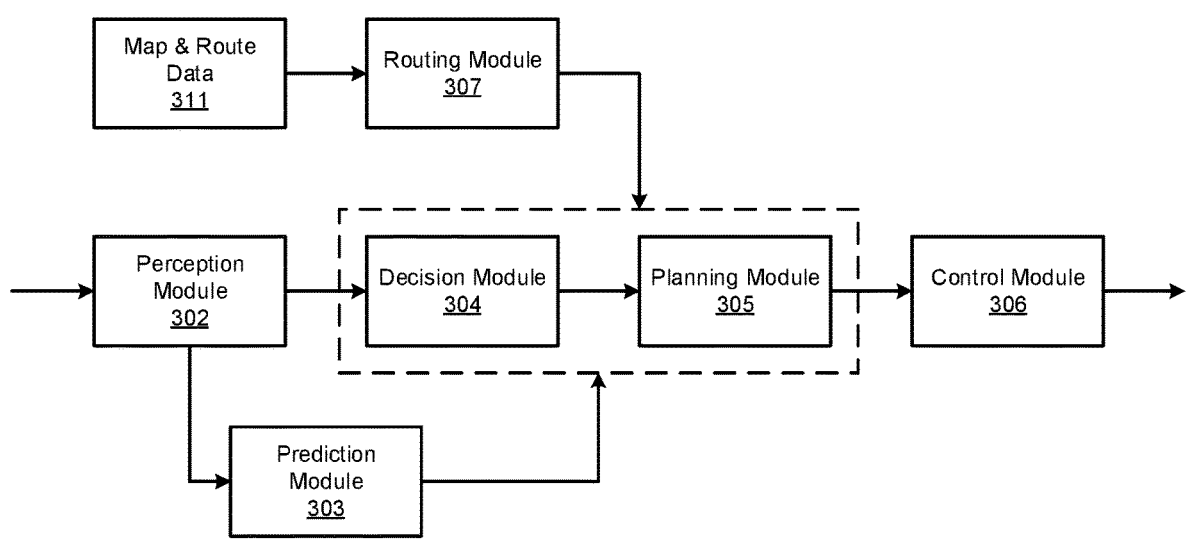

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, extrinsic matrix calibration module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

The output point clouds of the multiple LIDAR devices need to be transformed into a uniform frame of reference before they can be used for further processing, such as perception and planning processes. The uniform frame of reference used may commonly be the frame of reference of the Inertial Measurement Unit (IMU) of the autonomous driving vehicle. Such transformations may be referred to as LIDAR fusion, and are based on the extrinsic calibration parameters that can take the form of an extrinsic transformation/calibration matrix (or simply, an "extrinsic matrix"). Each LIDAR device may correspond to one extrinsic matrix that can be utilized in the transformation of the point cloud output of the LIDAR device into the common frame of reference. The calculation of an extrinsic matrix, and the transformation of the frame of reference of a point cloud based on an extrinsic matrix are well known in the art. A non-limiting example extrinsic matrix is provided below for illustrative purposes:

| | | | |
|---|---|---|---|
| −0.9996169 | 0.0132127 | 0.0243206 | −1.031551335280542 |
| −0.0133401 | −0.9998981 | −0.0050837 | 2.850186643560487 |
| 0.0242509 | −0.0054062 | 0.9996913 | −1.327350643335102 |
| 0 | 0 | 0 | 1 |

Figure 4:
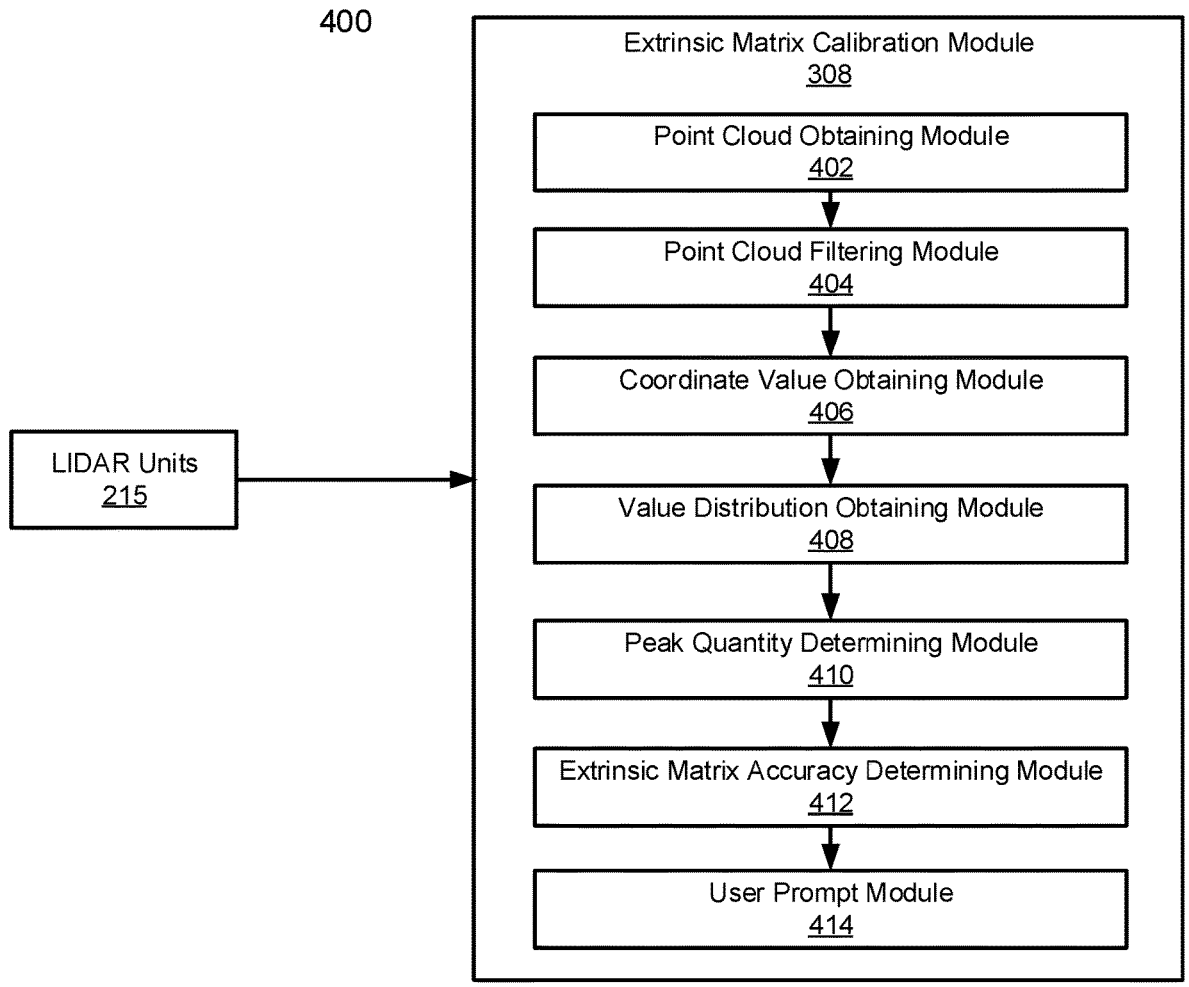
FIG. 4 is a block diagram illustrating various modules utilized in the determination of whether all extrinsic matrices are accurate according to one embodiment.

Referring to FIG. 4, a block diagram 400 illustrating various modules utilized in the determination of whether all extrinsic matrices are accurate according to one embodiment is shown. Within the extrinsic matrix calibration module 308, a plurality of post-LIDAR fusion point clouds that are based on simultaneous outputs from a plurality of LIDAR devices 215 installed at one autonomous driving vehicle (ADV) 101 are obtained. In particular, a respective first quantity of continuous frames of point clouds are obtained based on outputs from each of the plurality of LIDAR devices 215.

In one non-limiting embodiment, the respective first quantity of continuous frames of point clouds comprise between 100 to 100,000 frames of point clouds. In one embodiment, 1,000 continuous frames of point clouds are obtained from at least some of the plurality of LIDAR devices 215 each. It should be appreciated that the quantity of points within each frame of point cloud depends on the particular LIDAR device. For example, a HESAI 40-channel LIDAR outputs approximately 34,000 points in each frame. At the point cloud filtering module 404, the obtained plurality of point clouds is filtered to obtain a first set of points comprising all points in the plurality of point clouds that fall within a region of interest. The region of interest is an enclosed region in a bird's-eye view.

In one embodiment, the plurality of post-LIDAR fusion point clouds is obtained when a quantity of detectable above-ground objects within a predefined range (e.g., 10 meters) from the ADV is below a threshold. In one embodiment, no detectable above-ground object exists within the region of interest. At the coordinate value obtaining module 406, a first plurality of coordinate values on an axis in an up-down direction of the first set of points are obtained. In particular, each point in the first set of points corresponds to one coordinate value on the axis in the up-down direction. It should be appreciated that in a conventional IMU frame of reference, the axis in the up-down direction is the z-axis: the x-axis points left, the y-axis points forward, and the z-axis points up. Therefore, it should be further appeared that obtaining the first set of points comprising all points in the plurality of point clouds that fall within a region of interest, as described above, comprises obtaining all points whose x- and y-coordinates fall within the boundaries of the area of interest, the boundaries being defined in terms x- and y-coordinates as well.

At the value distribution obtaining module 408, a distribution of the first plurality of coordinate values is obtained. In one embodiment, obtaining the distribution of the first plurality of coordinate values comprises generating a histogram of the first plurality of coordinate values. In one non-limiting embodiment, a bin size of the histogram is between 0.05 meter (m) and 0.5 m. In one embodiment, the bin size of the histogram is 0.1 m. At the peak quantity determining module 410, a quantity of peaks in the distribution of the first plurality of coordinate values is determined. At the extrinsic matrix accuracy determining module 412, whether all extrinsic matrices associated with the plurality of LIDAR devices that are used in the LIDAR fusion process are accurate is determined based on the quantity of peaks in the distribution of the first plurality of coordinate values.

In one embodiment, all extrinsic matrices are determined accurate when the number of peaks is fewer than a predetermined threshold, such as, for example, a single peak, in the distribution of the first plurality of coordinate values. Similarly, all extrinsic matrices are determined not accurate (i.e., at least one extrinsic matrix is not accurate) when the number of peaks is greater than a predetermined threshold, such as, for example, one peak, in the distribution of the first plurality of coordinate values.

It should be appreciated that the determination of whether all extrinsic matrices are accurate based on the quantity of peaks in the distribution of the first plurality of coordinate values is based on the assumption that within the region of interest the LIDAR points obtained by the different LIDAR devices should correspond to the same ground or road surface. Thereafter, at the user prompt module 414, in response to determining that all extrinsic matrices associated with the plurality of LIDAR devices are not accurate, a user is prompted to recalibrate the extrinsic matrices. Note that some or all of the modules as shown in FIG. 4 may be integrated into fewer number of modules or a single module.

Figure 5:
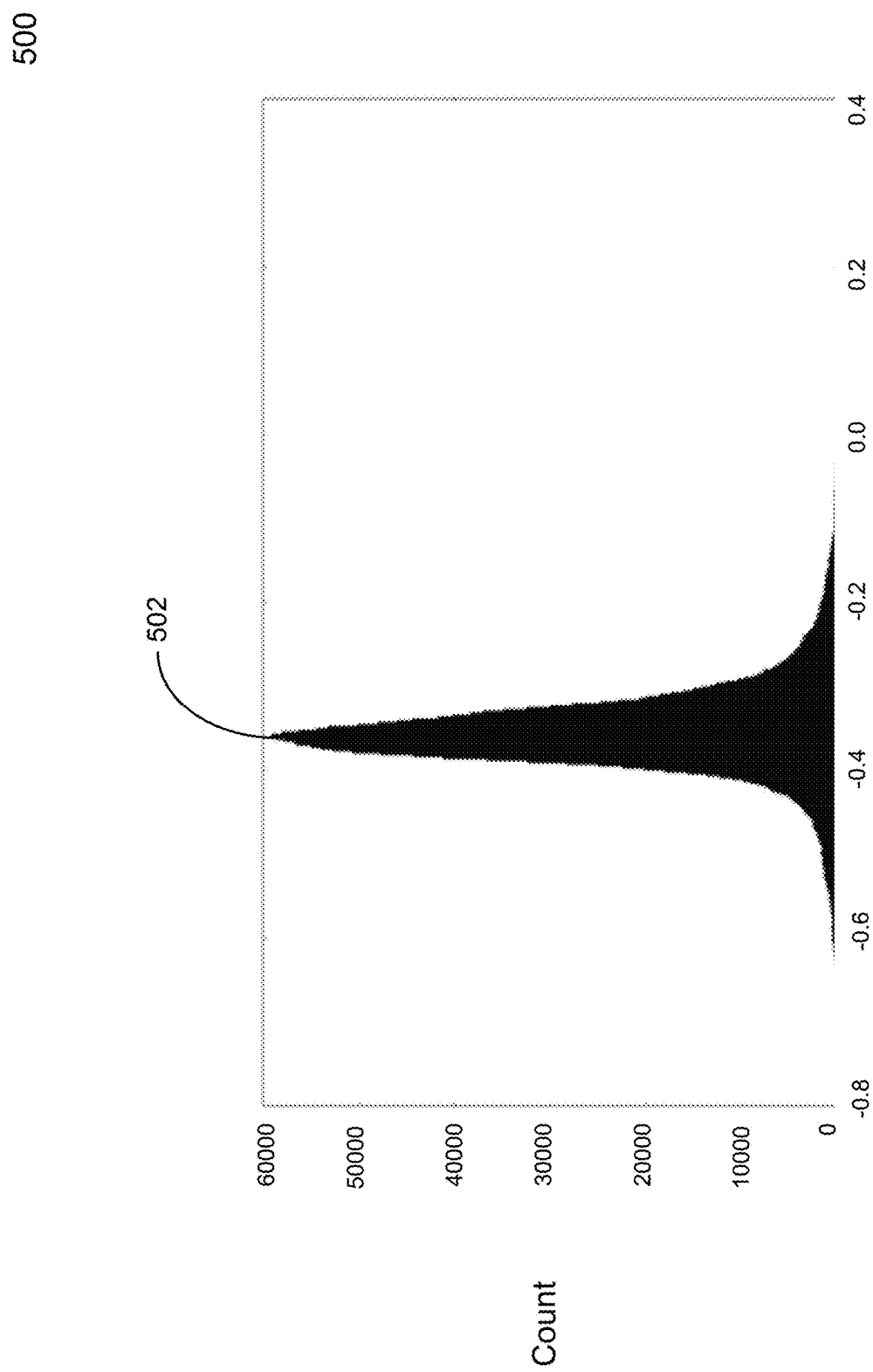
FIG. 5 is an example histogram illustrating an example distribution of the first plurality of coordinate values according to one embodiment.

Referring to FIG. 5, an example histogram 500 illustrating an example distribution of the first plurality of coordinate values according to one embodiment is shown. As can be seen, the histogram 500 contains a single peak 502 (e.g., below a predetermined threshold). Therefore, in this example shown, it can be determined that all extrinsic matrices are indeed accurate. Note that the above process can also be performed offline based on the point cloud data collected during online autonomous driving.

Figure 6:
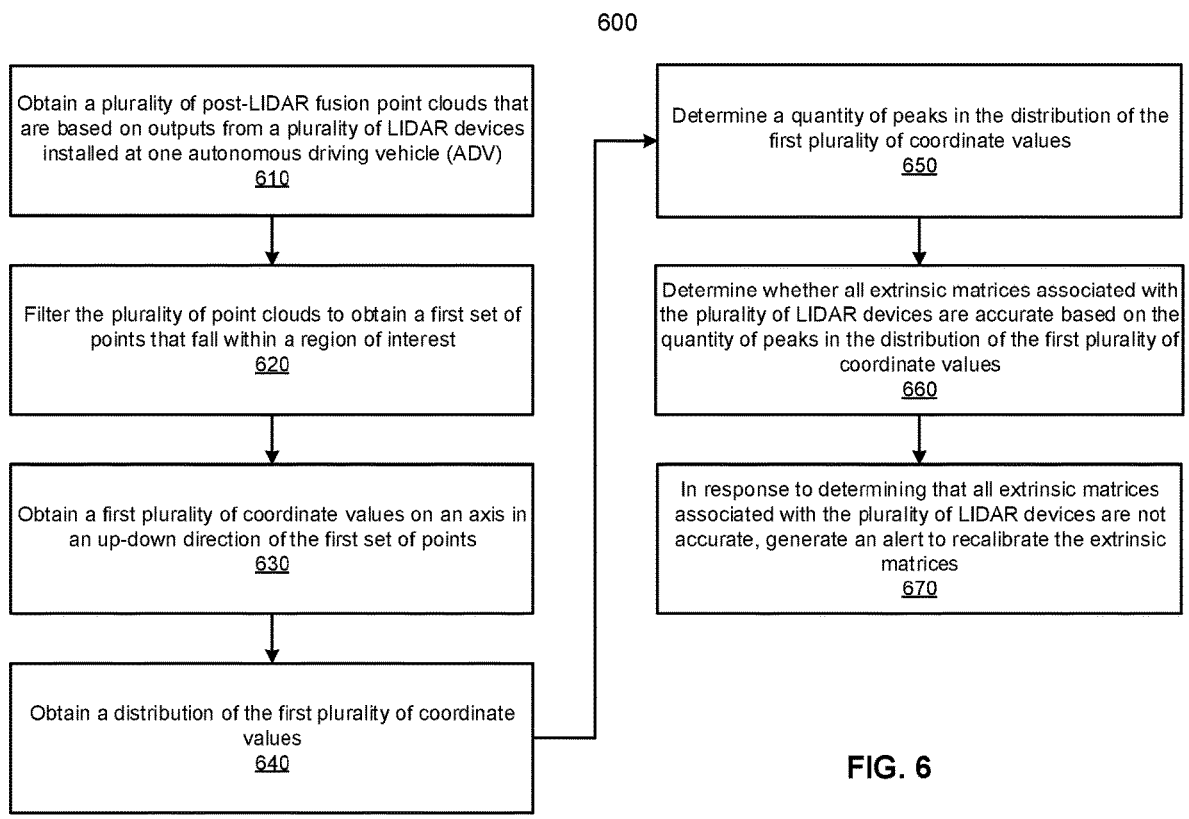
FIG. 6 is a flowchart illustrating an example method for determining whether all extrinsic matrices are accurate according to one embodiment.

Referring to FIG. 6, a flowchart illustrating an example method 600 for determining whether all extrinsic matrices are accurate according to one embodiment is shown. The process 600 may be implemented with appropriate hardware, software, or a combination thereof. At block 610, a plurality of post-LIDAR fusion point clouds that are based on simultaneous outputs from a plurality of LIDAR devices installed at one autonomous driving vehicle (ADV) are obtained. A respective first quantity of continuous frames of point clouds are obtained based on outputs from each of the plurality of LIDAR devices. At block 620, the point clouds are filtered to obtain a first set of points comprising all points in the point clouds that fall within a region of interest. In one embodiment, the region of interest is an enclosed region in a bird's-eye view.

At block 630, a first plurality of coordinate values on an axis in an up-down or vertical direction of the first set of points are obtained. Each point in the first set of points corresponds to one coordinate value on the axis in the up-down direction. At block 640, a distribution of the first plurality of coordinate values is obtained. At block 650, quantity of peaks in the distribution of the first plurality of coordinate values is determined. At block 660, whether all extrinsic matrices associated with the plurality of LIDAR devices are accurate or valid is determined based on the quantity of peaks in the distribution of the first plurality of coordinate values (e.g., a single peak in the distribution). Thereafter, at block 670, in response to determining that all extrinsic matrices associated with the plurality of LIDAR devices are not accurate, a signal is generated to indicate that recalibration the extrinsic matrices is needed.

In one embodiment, determining whether all extrinsic matrices associated with the plurality of LIDAR devices are accurate based on the quantity of peaks in the distribution of the first plurality of coordinate values comprises determining that all extrinsic matrices are accurate when there is a single peak in the distribution of the first plurality of coordinate values, and determining that all extrinsic matrices are not accurate when there are more than one peaks in the distribution of the first plurality of coordinate values.

In one embodiment, the plurality of post-LIDAR fusion point clouds is obtained when a quantity of detectable above-ground objects within a predefined range from the ADV is below a threshold. In one embodiment, no detectable above-ground object exists within the region of interest. In one embodiment, the respective first quantity of continuous frames of point clouds comprise between 100 to 100,000 frames of point clouds. In one embodiment, obtaining the distribution of the first plurality of coordinate values comprises generating a histogram of the first plurality of coordinate values. In one embodiment, a bin size of the histogram is between 0.05 meter (m) and 0.5 m.

Therefore, by utilizing embodiments of the disclosure herein, whether all extrinsic matrices associated with a plurality of LIDAR devices installed at one ADV can be determined. The process according to the embodiments may be performed as needed, for example, during daily tests of autonomous operation of the ADV or when the ADV is driven manually. A user may be prompted to perform a recalibration of the extrinsic matrices when all the matrices are determined not accurate. Therefore, errors that may result in the object detection process and the further perception and planning processes from inaccurate extrinsic matrices when a plurality of LIDAR devices are utilized at an ADV can be avoided.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   obtaining a plurality of post-LIDAR fusion point clouds that are based on outputs from a plurality of LIDAR devices installed at one autonomous driving vehicle (ADV);
   filtering the obtained plurality of point clouds to obtain a first set of points within a region of interest;
   obtaining a first plurality of coordinate values on an axis in a vertical direction of the first set of points, wherein the axis is respective of a three-dimensional coordinate system, and wherein each point in the first set of points corresponds to one coordinate value on the axis in the vertical direction;
   obtaining a distribution of the first plurality of coordinate values to determine a quantity of peaks in the distribution of the first plurality of coordinate values; and
   determining whether all extrinsic matrices associated with the plurality of LIDAR devices are valid based on the quantity of peaks in the distribution of the first plurality of coordinate values, wherein the extrinsic matrices are utilized to transform subsequent point clouds to a uniformed format for perception of driving environment of the ADV.

2. The method of claim 1, wherein determining whether all extrinsic matrices associated with the plurality of LIDAR devices are valid comprises:
   determining that all extrinsic matrices are valid when a number of peaks in the distribution of the first plurality of coordinate values is below a first predetermined threshold, and
   determining that all extrinsic matrices are invalid when the number of peaks in the distribution of the first plurality of coordinate values is above a second predetermined threshold.

3. The method of claim 2, wherein all extrinsic matrices associated with the LIDAR devices are invalid more than one peak existed in the distribution.

4. The method of claim 1, wherein the plurality of post-LIDAR fusion point clouds are obtained when a quantity of detectable above-ground objects within a predefined range from the ADV is below a predetermined threshold.

5. The method of claim 1, wherein each of the LIDAR devices generates continuous frames of point clouds approximately between 100 to 100,000 frames of point clouds.

6. The method of claim 1, wherein no detectable above-ground object exists within the region of interest.

7. The method of claim 1, wherein obtaining the distribution of the first plurality of coordinate values comprises generating a histogram of the first plurality of coordinate values.

8. The method of claim 7, wherein a bin size of the histogram is between 0.05 meter (m) and 0.5 m.

9. The method of claim 1, wherein the region of interest represents an enclosed region in a bird's-eye view.

10. A non-transitory machine-readable medium having instructions stored therein, which when executed by a processor, cause the processor to perform operations, the operations comprising:
    obtaining a plurality of post-LIDAR fusion point clouds that are based on outputs from a plurality of LIDAR devices installed at one autonomous driving vehicle (ADV);
    filtering the obtained plurality of point clouds to obtain a first set of points within a region of interest;
    obtaining a first plurality of coordinate values on an axis in a vertical direction of the first set of points, wherein the axis is respective of a three-dimensional coordinate system, and wherein each point in the first set of points corresponds to one coordinate value on the axis in the vertical direction;
    obtaining a distribution of the first plurality of coordinate values to determine a quantity of peaks in the distribution of the first plurality of coordinate values; and
    determining whether all extrinsic matrices associated with the plurality of LIDAR devices are valid based on the quantity of peaks in the distribution of the first plurality of coordinate values, wherein the extrinsic matrices are utilized to transform subsequent point clouds to a uniformed format for perception of driving environment of the ADV.

11. The machine-readable medium of claim 10, wherein determining whether all extrinsic matrices associated with the plurality of LIDAR devices are valid comprises:
    determining that all extrinsic matrices are valid when a number of peaks in the distribution of the first plurality of coordinate values is below a first predetermined threshold, and
    determining that all extrinsic matrices are invalid when the number of peaks in the distribution of the first plurality of coordinate values is above a second predetermined threshold.

12. The machine-readable medium of claim 11, wherein all extrinsic matrices associated with the LIDAR devices are invalid more than one peak existed in the distribution.

13. The machine-readable medium of claim 10, wherein the plurality of post-LIDAR fusion point clouds are obtained when a quantity of detectable above-ground objects within a predefined range from the ADV is below a predetermined threshold.

14. The machine-readable medium of claim 10, wherein each of the LIDAR devices generates continuous frames of point clouds approximately between 100 to 100,000 frames of point clouds.

15. The machine-readable medium of claim 10, wherein no detectable above-ground object exists within the region of interest.

16. The machine-readable medium of claim 10, wherein obtaining the distribution of the first plurality of coordinate values comprises generating a histogram of the first plurality of coordinate values.

17. The machine-readable medium of claim 16, wherein a bin size of the histogram is between 0.05 meter (m) and 0.5 m.

18. The machine-readable medium of claim 10, wherein the region of interest represents an enclosed region in a bird's-eye view.

19. A data processing system, comprising:
    a processor; and
    a memory coupled to the processor to store instructions, which when executed by the processor, cause the processor to perform operations, the operations including
    obtaining a plurality of post-LIDAR fusion point clouds that are based on outputs from a plurality of LIDAR devices installed at one autonomous driving vehicle (ADV);
    filtering the obtained plurality of point clouds to obtain a first set of points within a region of interest;
    obtaining a first plurality of coordinate values on an axis in a vertical direction of the first set of points, wherein the axis is respective of a three-dimensional coordinate system, and wherein each point in the first set of points corresponds to one coordinate value on the axis in the vertical direction;
    obtaining a distribution of the first plurality of coordinate values to determine a quantity of peaks in the distribution of the first plurality of coordinate values; and
    determining whether all extrinsic matrices associated with the plurality of LIDAR devices are valid based on the quantity of peaks in the distribution of the first plurality of coordinate values, wherein the extrinsic matrices are utilized to transform subsequent point clouds to a uniformed format for perception of driving environment of the ADV.

20. The system of claim 19, wherein determining whether all extrinsic matrices associated with the plurality of LIDAR devices are valid comprises:
    determining that all extrinsic matrices are valid when a number of peaks in the distribution of the first plurality of coordinate values is below a first predetermined threshold, and
    determining that all extrinsic matrices are invalid when the number of peaks in the distribution of the first plurality of coordinate values is above a second predetermined threshold.

* * * * *